United States Patent
Zhang et al.

(10) Patent No.: US 10,552,417 B2
(45) Date of Patent: *Feb. 4, 2020

(54) SYSTEM AND METHODS FOR LEVERAGING AN OBJECT CACHE TO MONITOR NETWORK TRAFFIC

(71) Applicant: Akamai Technologies, Inc., Cambridge, MA (US)

(72) Inventors: Eugene Y. Zhang, San Jose, CA (US); Patrice Boffa, Mountain View, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 706 days.

This patent is subject to a terminal disclaimer.

(21) Appl. No.: 15/352,142

(22) Filed: Nov. 15, 2016

(65) Prior Publication Data
US 2017/0060952 A1  Mar. 2, 2017

Related U.S. Application Data

(63) Continuation of application No. 14/475,036, filed on Sep. 2, 2014, now Pat. No. 9,531,720.

(51) Int. Cl.
| | |
|---|---|
| *G06F 7/00* | (2006.01) |
| *G06F 15/173* | (2006.01) |
| *G06F 16/2455* | (2019.01) |
| *H04L 29/06* | (2006.01) |
| *H04L 29/08* | (2006.01) |

(52) U.S. Cl.
CPC ......... *G06F 16/2455* (2019.01); *H04L 63/06* (2013.01); *H04L 63/10* (2013.01); *H04L 63/20* (2013.01); *H04L 67/02* (2013.01); *H04L 67/2842* (2013.01); *H04L 67/2852* (2013.01); *H04L 63/0281* (2013.01)

(58) Field of Classification Search
None
See application file for complete search history.

(56) References Cited

U.S. PATENT DOCUMENTS

| | | | |
|---|---|---|---|
| 6,108,703 A | 8/2000 | Leighton et al. | |
| 7,240,100 B1 | 7/2007 | Wein et al. | |
| 7,376,716 B2 | 5/2008 | Dilley et al. | |
| 7,596,619 B2 | 9/2009 | Leighton et al. | |
| 8,458,769 B2 | 6/2013 | Dilley et al. | |
| 2005/0066063 A1* | 3/2005 | Grigorovitch | H04N 7/163 710/1 |

(Continued)

OTHER PUBLICATIONS

U.S. Appl. No. 14/475,036.

*Primary Examiner* — Fatoumata Traore

(57) ABSTRACT

According to non-limiting embodiments disclosed herein, the functionality of an object cache in a server can be extended to monitor and track web traffic, and in particular to perform rate accounting on selected web traffic. As the server communicates with clients (e.g., receiving HTTP requests and responding to those requests), the server can use its existing object cache storage and existing object cache services to monitor web traffic by recording how often a client makes a particular request in the object cache and/or other data about the requests. Preferably, the object cache is still used for conventional caching of objects, the object cache thus providing a dual role by storing both web objects and rate accounting data.

15 Claims, 8 Drawing Sheets

(56) References Cited

U.S. PATENT DOCUMENTS

| | | | |
|---|---|---|---|
| 2011/0153724 A1* | 6/2011 | Raja | H04L 67/325 |
| | | | 709/203 |
| 2011/0320701 A1* | 12/2011 | Bronson | G06F 12/0855 |
| | | | 711/106 |
| 2013/0254260 A1 | 9/2013 | Stevens et al. | |
| 2013/0254343 A1 | 9/2013 | Stevens et al. | |
| 2015/0200994 A1* | 7/2015 | Jain | H04L 67/02 |
| | | | 709/219 |
| 2016/0065576 A1 | 3/2016 | Zhang | |

* cited by examiner

SYSTEM AND METHODS FOR LEVERAGING AN OBJECT CACHE TO MONITOR NETWORK TRAFFIC

This application is a continuation of U.S. application Ser. No. 14/475,036, filed Sep. 2, 2014, the disclosure of which is hereby incorporated by reference in its entirety.

This patent document may contain material which is subject to copyright protection. The copyright owner has no objection to the facsimile reproduction by anyone of the patent document or the patent disclosure, as it appears in Patent and Trademark Office patent files or records, but otherwise reserves all copyright rights whatsoever.

BACKGROUND

Technical Field

This patent document relates generally to distributed data processing systems, to content delivery mechanisms and content caching, and to network security.

Brief Description of the Related Art

Content caching is well-known in the art. By caching content in an intermediary machine such as a cache server that is located in between a client and a content source such as an origin server, and directing the client to or through the intermediary, the delivery of content can be accelerated. Caching of web content is ubiquitous and caching mechanisms have been well-described in the field, see for example Request for Comments (RFCs) 2616 and 7234 of the Internet Engineering Task Force (IETF).

In general, an intermediary machine with an object cache and running a hypertext transfer protocol (HTTP) proxy server application operates as follows: a client request is received for particular web object, such as an HTML document or an image; the intermediary machine determines a cache key, typically based on the requested URL; the machine looks in its cache using the key to see if it has the object (a cache hit) and if so checks whether the object is valid (e.g., it is not expired); if the object is found and valid, it can be served to the client; if the object is not found in the cache or the object is found but it is expired (a cache miss), the machine must go back to an origin server, or in some cases another intermediary, to get the requested object or to revalidate the expired copy. Once the object is received or revalidated, it can be stored in the local cache for an amount of time (defined by a time to live or 'TTL' value) and served in response to subsequent client requests.

A variety of types of intermediary object caches are known in the art, such as transparent cache servers, and forward and reverse proxy cache servers.

Caching proxy servers are often used as the building blocks of distributed computer systems known as "content delivery networks" or "CDNs" that are operated and managed by a service provider. The service provider typically provides the content delivery service on behalf of third parties. The CDN infrastructure is shared by multiple tenants, the content providers. The infrastructure is generally used for the storage, caching, or transmission of content on behalf of content providers or other such tenants.

In a known system such as that shown in FIG. 1, a distributed computer system 100 is configured as a CDN and has a set of servers 102 distributed around the Internet. Typically, most of the servers are located near the edge of the Internet, i.e., at or adjacent end user access networks. A network operations command center (NOCC) 104 may be used to administer and manage operations of the various machines in the system. Third party sites affiliated with content providers, such as origin 106 hosting a web site, offload delivery of objects (e.g., HTML or other markup language files, embedded page objects, streaming media, software downloads, and the like) to the distributed computer system 100 and, in particular, to the CDN servers (which are, as noted, caching proxy servers). The CDN servers 102 may be grouped together into a point of presence (POP) 107 at a particular geographic location.

The CDN servers are typically located at nodes that are publicly-routable on the Internet, in end-user access networks, in peering points, within or adjacent nodes that are located in mobile networks, in or adjacent enterprise-based private networks, or in any combination thereof.

Content providers offload their content delivery by aliasing (e.g., by a DNS CNAME) given content provider domains or sub-domains to domains that are managed by the service provider's authoritative domain name service. The service provider's domain name service directs end user client machines 122 that desire content to the distributed computer system (or more particularly, to one of the CDN servers 102 in the platform) to obtain the content more reliably and efficiently. The CDN servers 102 respond to the client requests, for example by fetching requested content from a local cache, from another CDN server 102, from the origin server 106 associated with the content provider, or other source, and serving it to the requesting client.

For cacheable content, CDN servers 102 typically employ on a caching model that relies on setting a TTL for each cacheable object. After it is fetched, the object may be stored locally at a given CDN server 102 until the TTL expires, at which time is typically re-validated or refreshed from the origin server 106. For non-cacheable objects (sometimes referred to as 'dynamic' content), the CDN server 102 typically returns to the origin server 106 time when the object is requested by a client. The CDN may operate a server cache hierarchy to provide intermediate caching of customer content in various CDN servers 102 that are between the CDN server 102 handling a client request and the origin server 106; one such cache hierarchy subsystem is described in U.S. Pat. No. 7,376,716, the disclosure of which is incorporated herein by reference.

Although not shown in detail in FIG. 1, the distributed computer system may also include other infrastructure, such as a distributed data collection system 108 that collects usage and other data from the CDN servers 102, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a domain name service (DNS) query handling mechanism 115. A distributed data transport mechanism 120 may be used to distribute control information (e.g., metadata to manage content, to facilitate load balancing, and the like) to the CDN servers 102.

As illustrated in FIG. 2, a given machine 200 in the CDN comprises commodity hardware (e.g., a microprocessor) 202 running an operating system kernel (such as Linux® or variant) 204 that supports one or more applications 206. To facilitate content delivery services, for example, given machines typically run a set of applications, such as an HTTP proxy 207, a name service 208, a local monitoring process 210, a distributed data collection process 212, and the like. The HTTP proxy 207 typically includes a manager process for managing an object cache and delivery of content from the machine. The object cache may reside in volatile or non-volatile memory, represented by hardware 202 in FIG. 3.

A given CDN server 102 shown in FIG. 1 may be configured to provide one or more extended content delivery features, preferably on a domain-specific, content-provider-specific basis, preferably using configuration files that are distributed to the CDN servers 102 using a configuration system. A given configuration file preferably is XML-based and includes a set of content handling rules and directives that facilitate one or more advanced content handling features. The configuration file may be delivered to a particular CDN server 102 via the data transport mechanism. U.S. Pat. No. 7,240,100, the disclosure of which is hereby incorporated by reference, describe a useful infrastructure for delivering and managing such content control information. This and other control information (sometimes referred to as "metadata") can be provisioned by the CDN service provider itself, or by the content provider customer who operates the origin server 106. More information about CDN platforms can be found in U.S. Pat. Nos. 6,108,703 and 7,596,619, the disclosures of which are hereby incorporated by reference in their entireties.

It is an object of the teachings hereof to leverage object caches, such as those described above in CDNs, to record and compile information about web traffic, and to perform rate accounting on client request traffic. This information can be used to detect malicious or undesirable activity. It is a further object of the teachings hereof to enable monitoring of web traffic across a plurality of object caches. Further advantages, benefits, and uses of the teachings hereof will be apparent from the description below and the appended drawings.

SUMMARY

The functionality of a server's object cache can be extended to monitor and track web traffic, and in particular to perform rate accounting on web traffic. As the server communicates with clients (e.g., receiving HTTP requests and responding to those requests), the server can use its existing object cache storage and existing object cache services to monitor web traffic by recording in the object cache how often a client makes a particular request, and/or other data about the requests. Preferably, the object cache is still used for conventional caching of objects, the object cache thus providing a dual role by storing both web objects and rate accounting data.

In some embodiments, multiple object caches can be coordinated to record information about web traffic across multiple servers, data centers, and/or geographies. The pre-existing hierarchical nature of some caching deployments can be exploited, using a cache parent to collect and record information about web traffic seen by multiple child object caches.

The foregoing merely refers to examples of the invention and selected aspects thereof, for illustrative purposes. It is not limiting. The claims alone define the scope of protection that is sought. The subject matter of the appended claims is incorporated by reference herein.

BRIEF DESCRIPTION OF THE DRAWINGS

The invention will be more fully understood from the following detailed description taken in conjunction with the accompanying drawings, in which.

DETAILED DESCRIPTION

Figure 1:
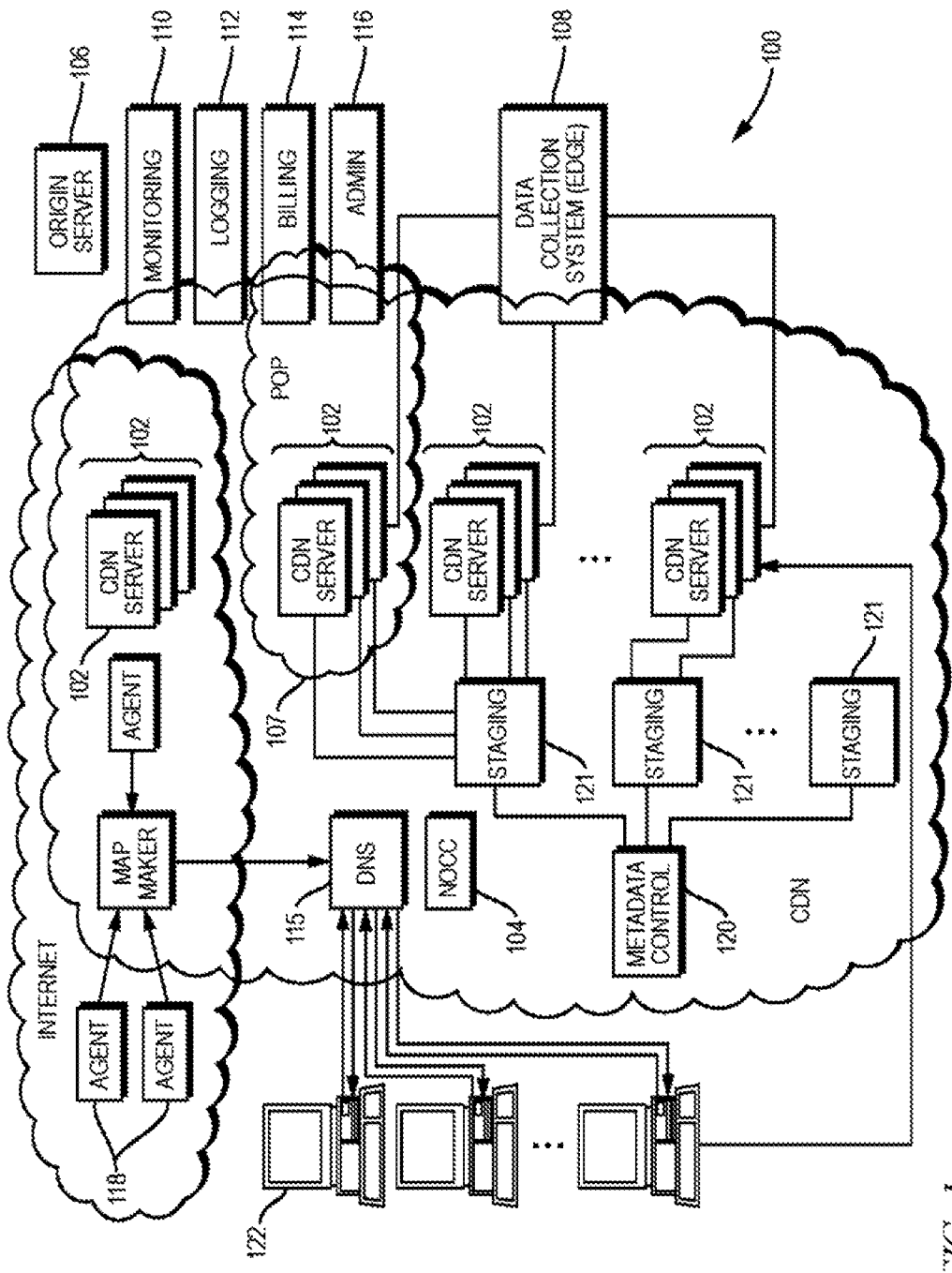
FIG. 1 is a schematic diagram illustrating an embodiment of a known distributed computer system configured as a content delivery network (CDN)
Figure 2:
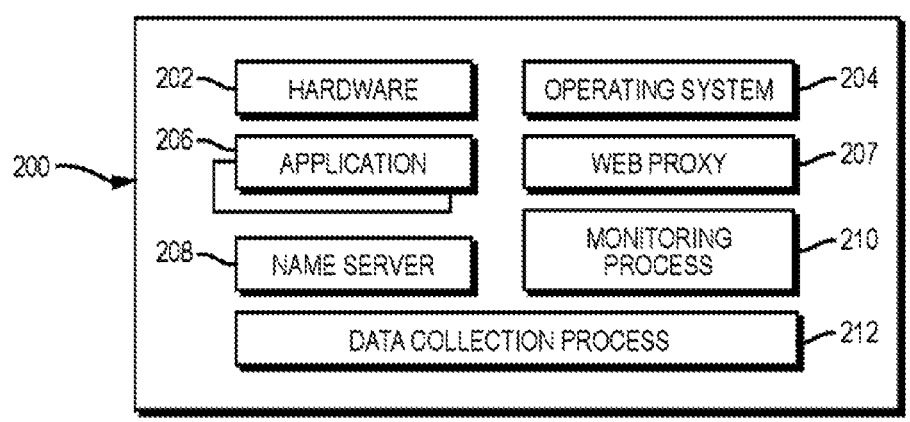
FIG. 2 is a schematic diagram illustrating an embodiment of a server machine on which a CDN server in the system of FIG. 1 can be implemented.

The following description sets forth embodiments of the invention to provide an overall understanding of the principles of the structure, function, manufacture, and use of the methods and apparatus disclosed herein. The systems, methods and apparatus described herein and illustrated in the accompanying drawings are non-limiting examples; the claims alone define the scope of protection that is sought. The features described or illustrated in connection with one exemplary embodiment may be combined with the features of other embodiments. The allocation of functions to particular machines is not limiting, as the functions recited herein may be combined or split amongst different machines in a variety of ways. Such modifications and variations are intended to be included within the scope of the present invention. All patents, publications and references cited herein are expressly incorporated herein by reference in their entirety. Throughout this disclosure, the term "e.g." is used as an abbreviation for the non-limiting phrase "for example." The teachings hereof may be realized in a variety of systems, methods, apparatus, and non-transitory computer-readable media.

According to the teachings hereof, the functionality of an object cache in a server can be extended to monitor and track web traffic, and in particular to perform rate accounting on selected web traffic. As a server communicates with a client in a message exchange (e.g., receiving a HTTP request and processing and responding to that request), the server can use its existing object cache to record information about the client request and/or the message exchange. In particular, the server can keep a count of certain traffic, such as how many times a given client has requested a given page during a time period, or how many times a given client has submitted an HTML form to register for a promotion, during a given time period, or some desired aspect of traffic that a system user wants to track.

Preferably there is little or no modification to the object cache itself, though this is not a limitation of the teachings hereof. By using a largely or completely conventional object cache, existing data services and in particular the existing cache manager functions can be leveraged (e.g., cache refresh, cache bypass, and cache TTL expiry, and the like).

Preferably, the teachings hereof can enable object caches can be used for attack monitoring and detection. In this way, an object cache can be used instead of creating and running additional, custom databases for such purposes. Preferably, the objects cache is still used for caching of objects in the usual way, such that the object cache provides both functions at once, storing both web objects and the rate accounting data.

In some embodiments, multiple cache servers can be coordinated to record information about web traffic across multiple machines, data centers, and/or geographies. The hierarchical nature of known caching systems can be exploited, e.g., using a cache parent to collect and record information about web traffic seen by multiple child object caches.

The teachings hereof can be leveraged in proxy cache servers in a CDN operated and managed by a service provider on behalf of customer content providers, as described previously. Preferably each such content provider can independently configure how the CDN's proxy cache servers perform these services for traffic directed to that content provider's domain(s), using for example the metadata control solution mentioned previously.

Figure 3:
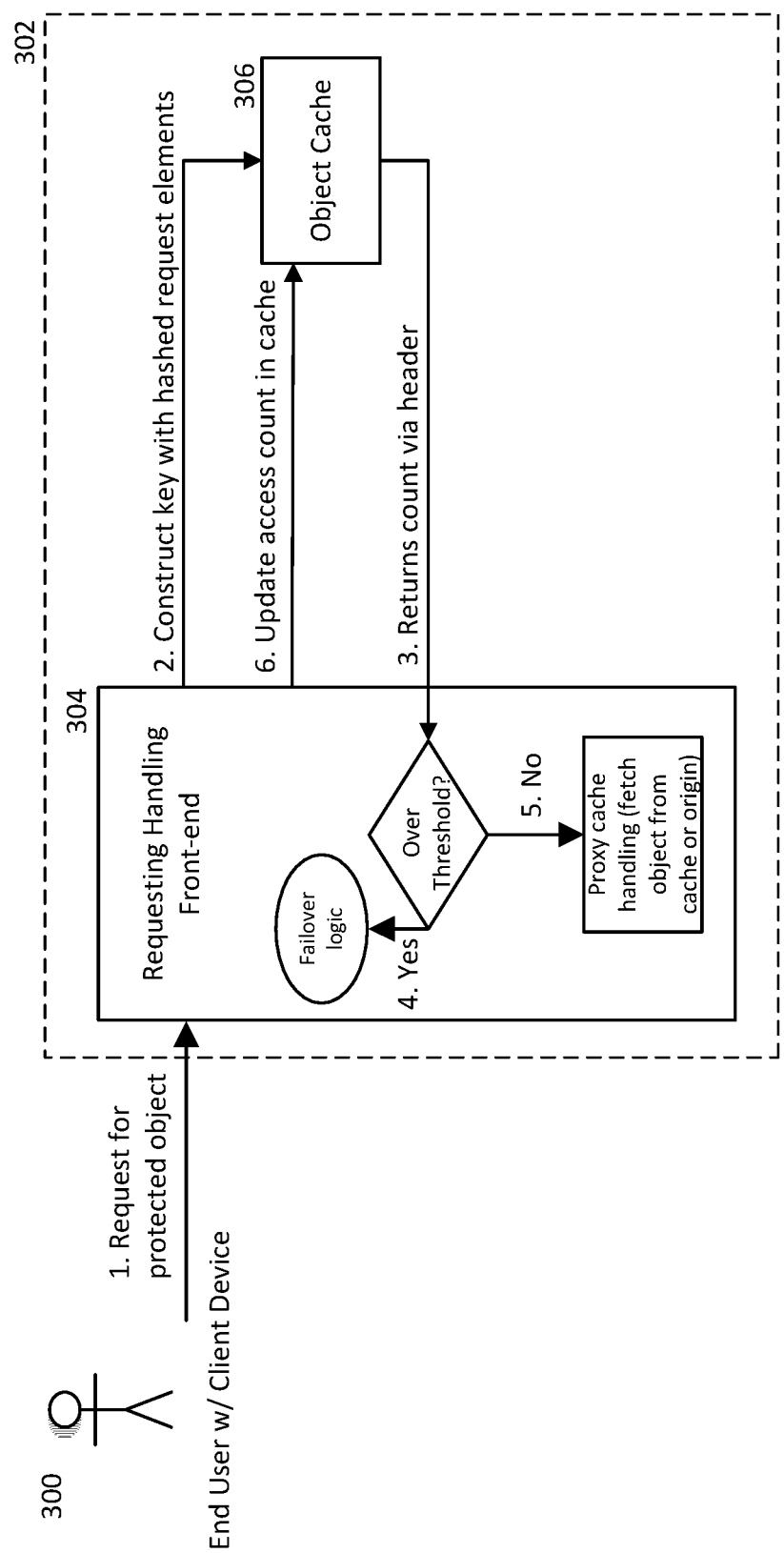
FIG. 3 is a schematic diagram illustrating an embodiment of a system for performing rate accounting with an object cache keeping track of the current count of traffic that is of interest.

FIG. 3 is a block diagram of an embodiment of a system in accordance with the teachings hereof. At step 1, an end-user client device 300 makes an HTTP request for a particular object, such as an HTML document or image, video segment, or otherwise. Server machine 302 runs proxy cache server software, which includes a request handling front-end 304 and an object cache 306, the latter including a cache manager and data store. Note that server machine 302 is denoted by a dotted line because the request handling front-end 304 and object cache 306 may not be resident in the same machine; in other words, the object cache 306 could be an object cache that is remote to the server machine 302 and the request handling front-end 304.

The front-end 304 receives the request, and determines (e.g., by consulting metadata) that the requested content is associated with a given content provider and is subject to monitoring and more particularly to rate accounting. The front-end 302 constructs a rate accounting cache key. In one embodiment, the key is in URL form with a designated rate accounting hostname (e.g., 'content-provider.rate-accounting.cdn.net') and it has a path incorporating elements of the request that are designated by a user (such as a content provider) from the client request. The particular elements to use in constructing the key are preferably configured independently by content provider users. For example, the path might be a hash of (client IP address+session ID+URL parameter). The requested URL, including hostname and/or path, may be included in some cases. In some cases a POST argument can be used as part of the cache key. Generalizing, any field or parameter or aspect of a client request may be designated for use in constructing the cache key, and any number of them may be used. The selected elements in effect specify what requests are to be tracked. For example, using (client IP address+session ID+URL parameter) results in a cache key that "hits" in the object cache every time that combination is present in a client's request, and each hit increments a count that is kept in the object cache under that cache key. Note, however, that a client IP address and session ID are sometimes ineffective to track requests from distributed denial of service attack, because in many such attacks multiple different machines are sending requests with the same request signature. In these situations, the user may select the particular elements of interest from which to construct the cache key to match the request signature of interest, e.g. using POST arguments, URL parameters, and the like.

In an alternate embodiment, a range of client IP addresses could be captured by the cache key. For example, the front-end 304 might use only a portion of the received client IP address, in other words applying a subnet mask so as to aggregate the 'hits' from a range of client IP addresses. The front-end 304 could also map the client IP addresses to a particular CIDR block of interest, and then use the CIDR block in the cache key, so as to aggregate the 'hits' from all clients in that block.

With reference to step 2 in FIG. 3, the front-end 304 accesses the object cache 306 using the constructed key. Again, note that in FIG. 3 the object cache is depicted as a local cache, but the object cache may be a local cache for server machine 302 or a remote cache (such as a parent cache in a remote machine). If the cache key lookup results in a match (hit) on an existing record, the object cache 306 returns the data stored under that key. The object cache 306 preferably functions in the same as if it were returning an object with associated HTTP headers to be served to a client. However, the data returned from the object cache 306 includes a header that indicates the current count (how many times that record has been accessed during the current time to live (TTL)). This is shown by step 3.

If the count exceeds a configured threshold, then the front-end 304 goes to failover logic 308 (step 4), which preferably involves taking some action against the request, such as blocking the request, alerting, serving an alternate page, and/or a countermeasure such as tarpitting the connection with the client device. The front-end 304 may work in conjunction with a web application firewall to block traffic if the front-end 304 determines that the permissible threshold was been exceeded, and to report that traffic to other firewalls. A web application firewall that can be used for this purpose is described in U.S. Pat. No. 8,458,769 and U.S. Publication Nos. 2013/0254260, the disclosures of which are hereby incorporated by reference in their entireties.

If the count is less than the threshold, then the request can be allowed and the front-end 304 handles it in the usual way that a proxy cache server would. This may involve checking the object cache again, this time for the actual content requested by the client device 300 (e.g., a web object such as an HTML document, image, or script), serving the object to the client device 300 from cache if the content is found and valid to serve (cache hit), or fetching the object from an origin server and relaying it to the client device 300 (cache miss), as shown by step 5.

In step 6, the front-end 304 issues an update message to the object cache which causes the object cache 306 to update the current access count for the cache key that was just requested.

Figure 4:
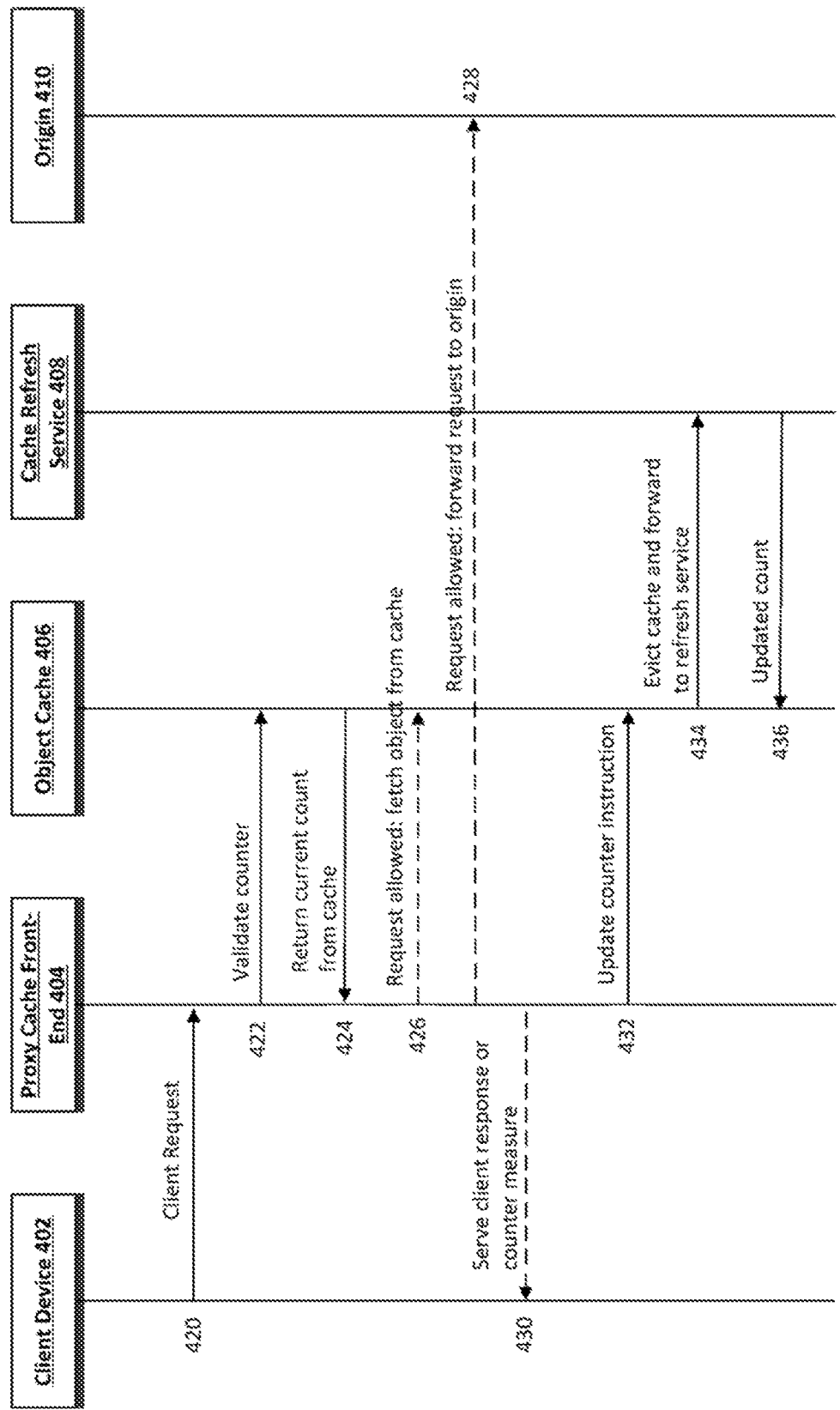
FIG. 4 is a sequence diagram illustrating an embodiment of a message sequence in the system of FIG. 3.

FIG. 4 is a sequence diagram illustrating an embodiment of the system in operation. At 420, the client device 402 makes an HTTP request to a proxy cache server's request handling front-end 404 (e.g., an HTTP get or post or other method). Assume that the front-end 404 is configured (e.g., via control metadata) to apply rate accounting to the request. In this embodiment, the front-end 404 initiates an intermediate routine to access the current count, constructing the rate accounting cache-key as described above (422). The control metadata preferably defines the elements of the request that are being tracked for rate accounting. As noted, the rate accounting may be based on client IP address, pathname, parameter, header, or other aspect of the HTTP request, or any combination thereof.

The object cache 406 receives the cache key, uses it to perform a lookup in cache storage, and returns the matching cache entry, which in this embodiment contains the current count in a header (424). As noted, the object cache 406 may be local or remote to the front-end 404. In many web caching architectures, caches are deployed hierarchically, with a cache parent being a source of content for child caches before going back to origin. In some embodiments, the object cache 406 may be a remote parent cache. Multiple child caches can be configured to communicate with the remote parent cache for rate accounting purposes. The parent cache keeps count of the number of "hits" across child caches. In this way, monitoring of web traffic naturally leverages an existing cache hierarchy deployment to monitor traffic across machines, regions, and/or geographies.

Returning to FIG. 4, the front-end 404 extracts the count from the header and compares the current count with a threshold. If the count exceeds the threshold (430), the request is not allowed and an action is taken against the request (e.g., error code, alternate page, honeypot, etc.).

If the count remains below the threshold, the request is allowed and the front-end 404 forwards the request to the origin server 410 to obtain the desired content, or (for cacheable content) initiates a second object cache lookup with a cache key based on the URL or in another conventional manner, this time looking for the web object itself (426, 428). The front-end 404 then serves the object to the client device 402 in a client response. Note that in some cases the first object cache lookup (for the count) and the second object cache lookup (for the content) may be to different machines. In particular, this can occur where the first object lookup is to a remote machine's object cache and the second object cache lookup is to a local machine's object cache.

After the request is processed (and preferably regardless of whether or not it was allowed), the front-end 404 initiates a procedure to update the count in the object cache (432). The object cache 406, upon receiving the update instruction—which includes the rate accounting cache key with the internal rate accounting hostname—evicts the cache entry and makes a forward request to a rate accounting refresh service 408 which is configured as origin (434). The refresh service 408 also may be local or remote to the object cache 406. The refresh service 408, acting as the origin for the object cache for rate accounting, responds with a cache entry that contains an incremented count in the header (436). The object cache 406 operates to replace the newly evicted cache entry with a new entry that contains the incremented count. This procedure will be described in more detail with respect to FIG. 5.

Figure 5:
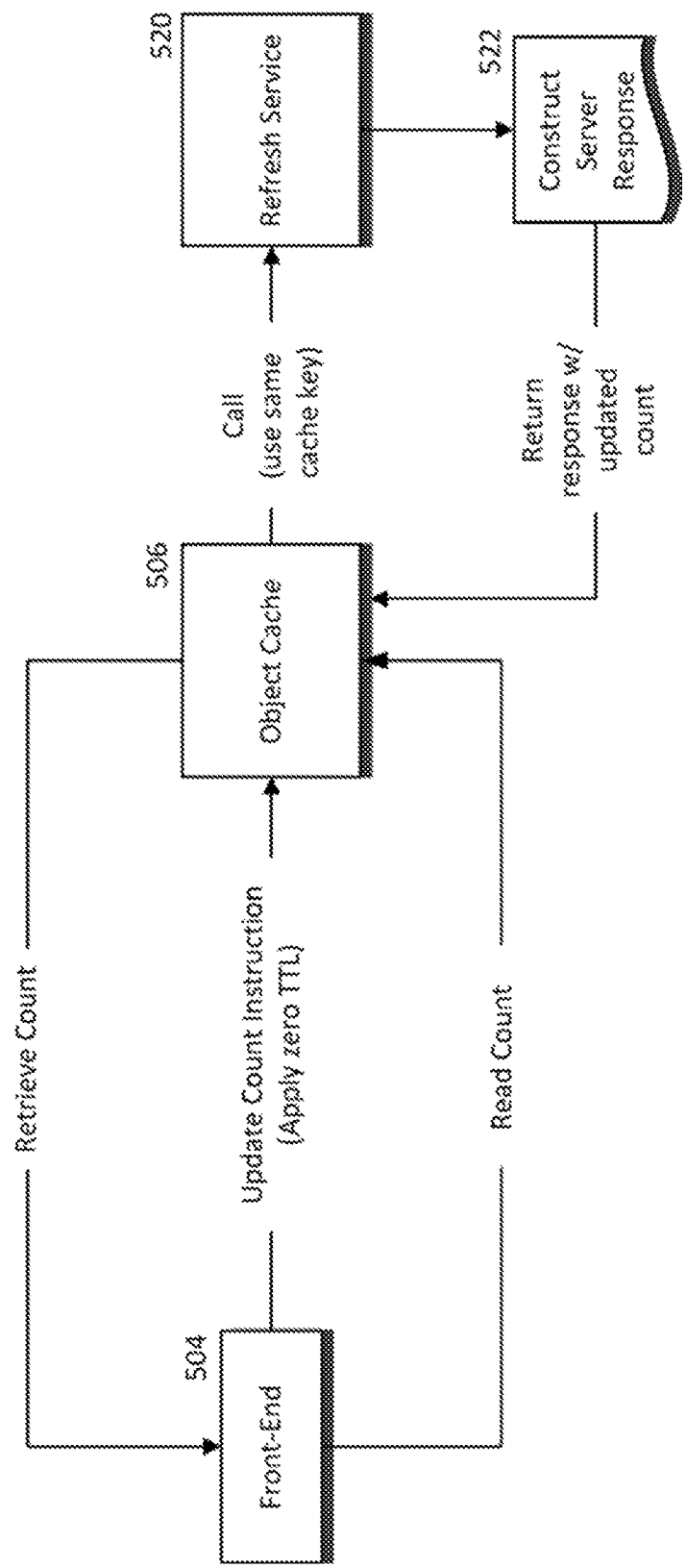
FIG. 5 is a schematic diagram illustrating an embodiment of object cache data storage operations in the system of FIG. 3.

FIG. 5 is a block diagram illustrating an embodiment of system operation, with particular focus on the object cache.

With reference to FIG. 5, the requesting handling front-end 504 asks the object cache 506 for the count via a read command with the rate accounting cache key, as described above. The front-end 504 retrieves the count from the object cache 506. After handling the request (the details of which are not shown in FIG. 5), the front-end 504 then issues an update instruction to the object cache 506. This instruction applies a zero TTL to the rate accounting cache entry and triggers an asynchronous refresh of the cache entry. The origin for the rate accounting cache entries is configured to point to a rate accounting refresh service 520 (which is preferably a local service). For example it might be configured pointing to an origin hostname 'content-provider.rate-accounting-refresh.cdn.net'. To perform the asynchronous refresh, the object cache 506 makes a forward request to the refresh service 520. The forward request contains the rate accounting cache key. The refresh service 520 reads the current count from the header field, increments the count and constructs a server response to the object cache 504 containing the updated count in the header field (522). This response is returned to the object cache 506, where it is stored under the rate accounting cache key.

Figure 6:
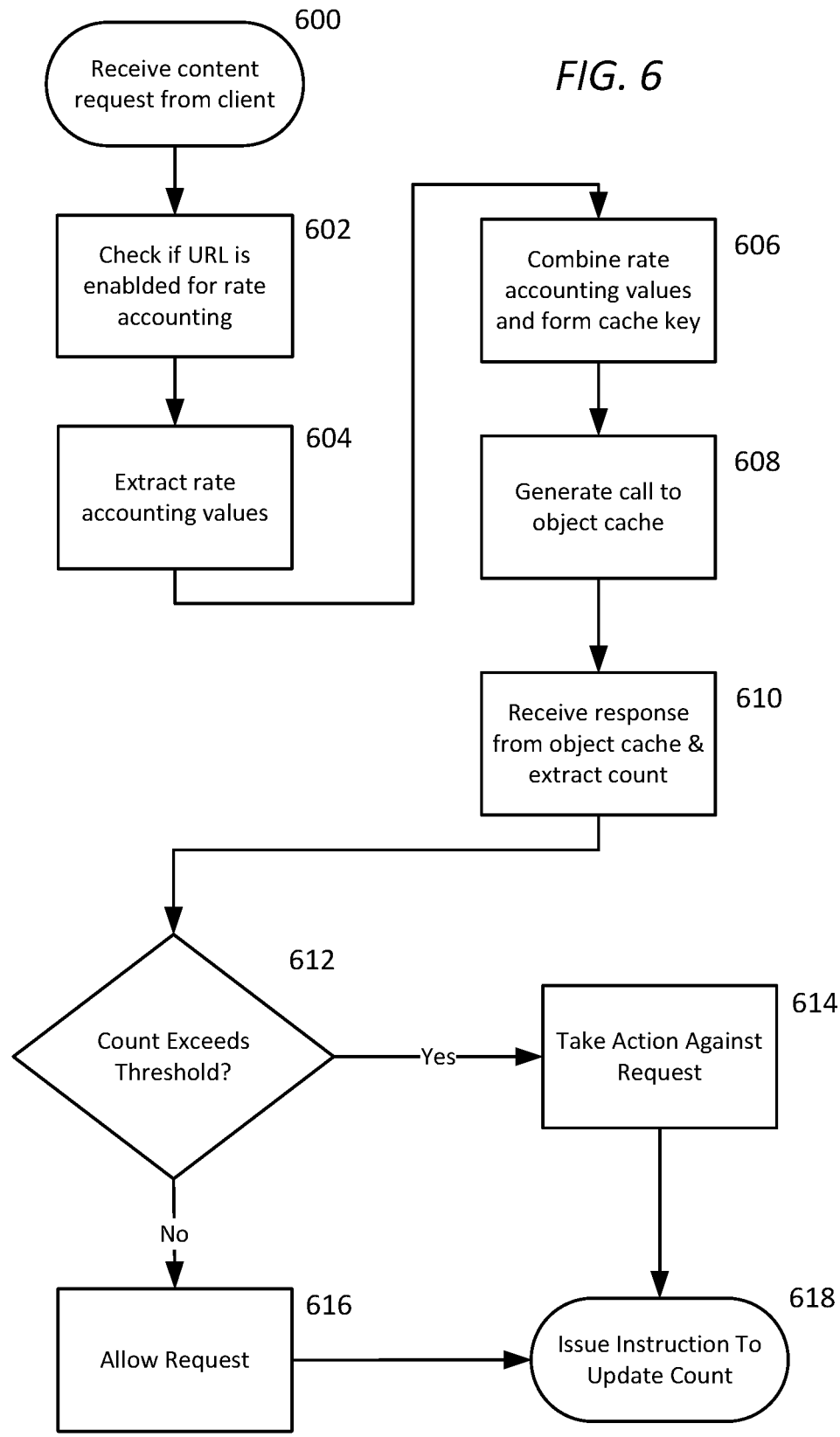
FIG. 6 is a flow diagram illustrating an embodiment of logical flow in the request handling front-end shown in FIGS. 3-5.

FIG. 6 is a flow a diagram illustrating logical flow operative in the request handling front-end 304/404/504 described above, in one embodiment.

At 600, a content request is received from a client. At 602, a check is performed to see if the requested URL is enabled for rate accounting. Preferably this check is done by looking up the content provider's metadata to see if they have enabled rate accounting for the requested URL.

At 604, rate accounting elements are extracted from the request. As noted, the rate accounting elements define the aspect of the request that the content provider user wants to track. For example, if a content provider wants to track the number of times that a given client device has requested a given page, the rate control values could be the client IP address and the URL for the given page.

At 606, the rate control elements are combined to form part of a cache key. This is preferably done by calculating a hash of certain values including the rate accounting elements. For example, % rate-accounting-hash=base64 (HMAC(rate-accounting-elements, salt)).

At 608, generate a call to object cache under a designated internal hostname for rate accounting (e.g., content-provider.rate-accounting.cdn.net) using the hash generated value generated above as the path. Thus, the rate accounting cache key becomes a URL with hostname: content-provider.rate-accounting.cdn.net and path:/% rate-accounting-hash.

At 610, the front-end receives the response from object cache and extract a response header containing the current count.

At 612, the count is tested against a configured threshold value. If the count exceeds the defined threshold, then a configurable action is taken against the request at 614. If the count does not exceed the defined threshold, then the request is allowed (616), and the request is processed by the server as usual. This further processing may involve generating a second cache key based on the content that is being requested by the client, as noted previously, per conventional object cache operation. For example, it is common to construct a cache key using the hostname and URL of the object to which the client's request is directed.

At 618, the front-end issues an instruction message to the object cache to update the count. In this embodiment, the instruction is a HTTP 'Get' request directed to the same rate accounting cache key as noted above, with a header indicating that it is an update instruction:

hostname: content-provider.rate-accounting.cdn.net
path:/% rate-accounting-hash

Figure 7:
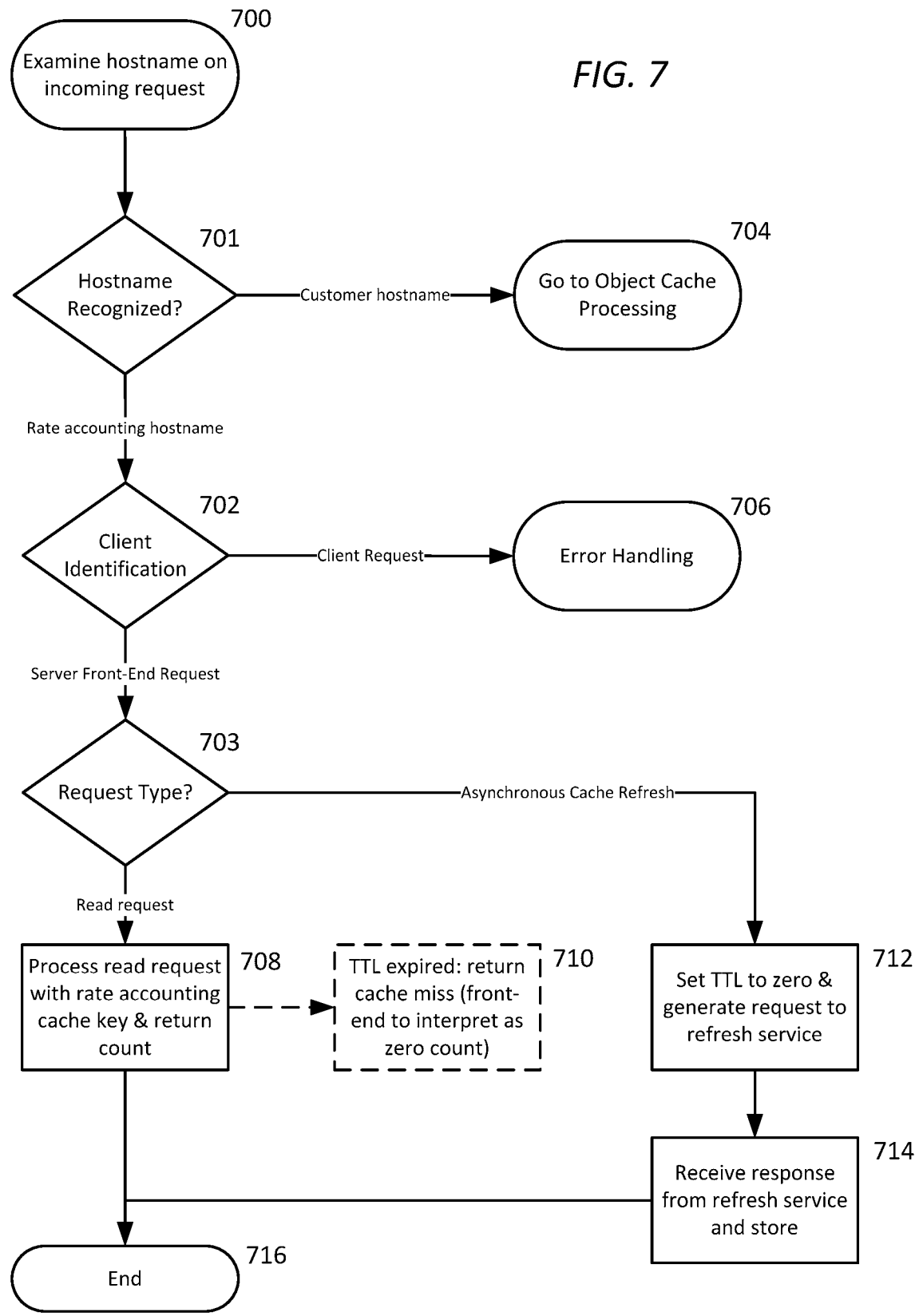
FIG. 7 is a flow diagram illustrating an embodiment of logical flow in the object cache shown in FIGS. 3-5; and, FIG. 8 is a block diagram illustrating hardware in a computer system that may be used to implement the teachings hereof.

FIG. 7 illustrates logical flow in the object cache 306/406/506, in one embodiment. At 700 and 701, the object cache receives a request and examines the incoming hostname. If the incoming hostname is the hostname used for rate accounting, then processing moves to 702 and the request type is checked. If the incoming hostname is a content provider hostname, then the request is for an object and not for the rate accounting functionality. Processing moves to 704, for conventional object caching.

At 702, the object cache checks the request source. If the request is from a client (706), the request is denied because client requests should not arrive on the hostname used for rate accounting. Only a request handling front-end in a server should be issuing such requests. If the request is from the front-end of a local server or remote server, then processing moves to 703.

The object cache checks the request type at 703. If the request from the front-end is a 'read' (708), then the object cache performs a cache lookup process using the cache key provided by the front end. In other words, the request represents a counter lookup from the front-end with the rate accounting cache key. From the object cache's perspective it appears as a typical cache read request. The object cache returns the cache entry if found and valid to serve (that is, TTL not expired).

Note that if the TTL has expired (710), then preferably the cache entry (with the count) is evicted from cache. Stale contents are not preserved. The object cache, in this situation, does not go forward but reports back to the front-end that the cache entry is not available, a cache "miss". The front-end then knows that the count is "zero". The front-end acts accordingly, allowing the request to be processed because it is below any configured threshold. The front-end then issues an update counter instruction to the object cache, which will use the update process (described in more detail with respect to 712 below) to update the count to "one" and store it as a cache entry. In this way, the TTL on the cache entry is thus the way to control the sample period for rate accounting. For example, a five minute TTL will cause the count to expire every five minutes, resetting the rate accounting.

With reference to 712, if the request type from the front-end is an update counter instruction for a given rate accounting cache key, then the object cache sets the corresponding cache entry to zero TTL, and then issues a forward request to the refresh service acting as origin. The refresh service receives the forward request and applies the desired TTL (which as noted defines the rate accounting period). The refresh service sees the current count in a request header, extracts the value of the current count from the request header into a variable, increments it, and constructs a server response for the object cache with the incremented count in a header and an empty response body. When the object cache receives this response (714), it stores it under the given rate accounting cache key for which the instruction was received. In this way, the counter is incremented. Processing ends at 716.

ALTERNATE EMBODIMENT

In the above description, the current count was stored in a header in the object cache's cache entry, but this is not a limitation of the teachings hereof. For example, in an alternative embodiment the count can be stored in the object cache in the response body. To do so, the system can operate largely as detailed above, except that the front-end can extract the count from the response body, and the refresh service stores the incremented count in the response body when responding to the object cache.

Use Cases

While not limiting, the description below presents some of the ways in which the teachings hereof can be applied.

Detect and mitigate brute force login attempts. The system can be used to track how many times a client has attempted to enter passwords for a single login across multiple sessions. If the number of attempts exceeds a threshold during a particular period of time (e.g., 10 minutes), the login can be disabled for that client.

Detect and mitigate bots and scrapers. The system can be used to prevent abuse of HTML form entries. For example, a client that submits a form multiple times can be counted and tracked. Such activity may indicate that a bot is abusing a registration process for a promotion, signing up multiple times through the form registration process. To track such activity, the rate accounting elements extracted from the client request might be, for example, a client IP address and the mailing address submitted by the client in a URL parameter or in a POST request body. The client may be blocked from further access, or served an alternate page, if the count exceeds a threshold.

Low Volume Denial of Service (DoS) Attack. Sometimes, DoS attacks may be carried out at a volume that is too low for a traditional firewall to detect (e.g., 1000 requests per hour), or the attack is dispersed across a set of machines such that the firewall on no single machine is triggered. Since it scales and leverages existing processes, object cache rate accounting can be used to count these requests even if at a low volume, and also can be used to count requests across multiple machines. A client that exceeds a threshold during a particular time period can be denied or served an alternate page.

Computer Based Implementation

The subject matter described herein may be implemented with computer systems, as modified by the teachings hereof, with the processes and functional characteristics described herein realized in special-purpose hardware, general-purpose hardware configured by software stored therein for special purposes, or a combination thereof.

Software may include one or several discrete programs. A given function may comprise part of any given module, process, execution thread, or other such programming construct. Generalizing, each function described above may be implemented as computer code, namely, as a set of computer instructions, executable in one or more microprocessors to provide a special purpose machine. The code may be executed using conventional apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 8:
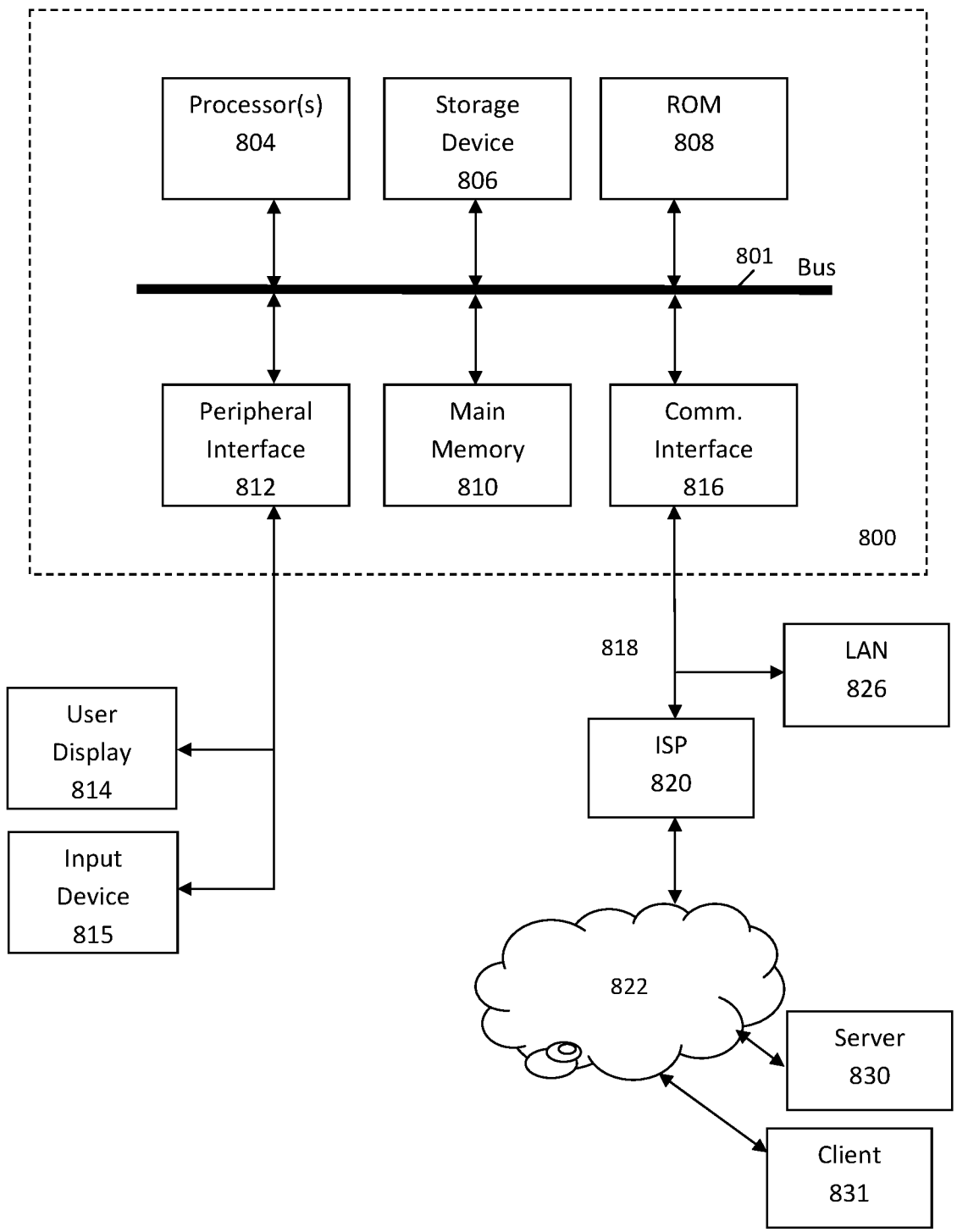

FIG. 8 is a block diagram that illustrates hardware in a computer system 800 on which embodiments of the invention may be implemented. The computer system 800 may be embodied in a client device, server, personal computer, workstation, tablet computer, wireless device, mobile device, network device, router, hub, gateway, or other device.

Computer system 800 includes a microprocessor 804 coupled to bus 801. In some systems, multiple microprocessor and/or microprocessor cores may be employed. Computer system 800 further includes a main memory 810, such as a random access memory (RAM) or other storage device, coupled to the bus 801 for storing information and instructions to be executed by microprocessor 804. A read only memory (ROM) 808 is coupled to the bus 801 for storing information and instructions for microprocessor 804. As another form of memory, a non-volatile storage device 806, such as a magnetic disk, solid state memory (e.g., flash memory), or optical disk, is provided and coupled to bus 801 for storing information and instructions. Other application-specific integrated circuits (ASICs), field programmable gate arrays (FPGAs) or circuitry may be included in the computer system 800 to perform functions described herein.

Although the computer system 800 is often managed remotely via a communication interface 816, for local administration purposes the system 800 may have a peripheral interface 812 communicatively couples computer system 800 to a user display 814 that displays the output of software executing on the computer system, and an input device 815 (e.g., a keyboard, mouse, trackpad, touchscreen) that communicates user input and instructions to the computer system 800. The peripheral interface 812 may include interface circuitry and logic for local buses such as Universal Serial Bus (USB) or other communication links.

Computer system 800 is coupled to a communication interface 816 that provides a link between the system bus 801 and an external communication link. The communication interface 816 provides a network link 818. The communication interface 816 may represent an Ethernet or other network interface card (NIC), a wireless interface, modem, an optical interface, or other kind of input/output interface.

Network link 818 provides data communication through one or more networks to other devices. Such devices include other computer systems that are part of a local area network (LAN) 826. Furthermore, the network link 818 provides a link, via an internet service provider (ISP) 820, to the Internet 822. In turn, the Internet 822 may provide a link to other computing systems such as a remote server 830 and/or a remote client 831. Network link 818 and such networks may transmit data using packet-switched, circuit-switched, or other data-transmission approaches.

In operation, the computer system 800 may implement the functionality described herein as a result of the microprocessor executing program code. Such code may be read from or stored on memory 810, ROM 808, or non-volatile storage device 806, which may be implemented in the form of disks, tapes, magnetic media, CD-ROMs, optical media, RAM, PROM, EPROM, and EEPROM. Any other non-transitory computer-readable medium may be employed. Executing code may also be read from network link 818 (e.g., following storage in an interface buffer, local memory, or other circuitry).

A client device may be a conventional desktop, laptop or other Internet-accessible machine running a web browser or other rendering engine, but as mentioned above a client may also be a mobile device. Any wireless client device may be utilized, e.g., a cellphone, pager, a personal digital assistant (PDA, e.g., with GPRS NIC), a mobile computer with a smartphone client, tablet or the like. Other mobile devices in which the technique may be practiced include any access protocol-enabled device (e.g., iOS™-based device, an Android™-based device, other mobile-OS based device, or the like) that is capable of sending and receiving data in a wireless manner using a wireless protocol. Typical wireless protocols include: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP. The WAP (wireless access protocol) also provides a set of network communication layers (e.g., WDP, WTLS, WTP) and corresponding functionality used with GSM and CDMA wireless networks, among others.

In a representative embodiment, a mobile device is a cellular telephone that operates over GPRS (General Packet Radio Service), which is a data technology for GSM networks. Generalizing, a mobile device as used herein is a 3G- (or next generation) compliant device that includes a subscriber identity module (SIM), which is a smart card that carries subscriber-specific information, mobile equipment (e.g., radio and associated signal processing devices), a man-machine interface (MMI), and one or more interfaces to external devices (e.g., computers, PDAs, and the like). The techniques disclosed herein are not limited for use with a mobile device that uses a particular access protocol. The mobile device typically also has support for wireless local area network (WLAN) technologies, such as Wi-Fi. WLAN is based on IEEE 802.11 standards. The teachings disclosed herein are not limited to any particular mode or application layer for mobile device communications.

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that trademarks appearing herein are the property of their respective owners and used for identification and descriptive purposes only, given the nature of the subject matter at issue, and not to imply endorsement or affiliation in any way.

The invention claimed is:

1. A method operative in a server machine, comprising:
receiving a message from a client, the message comprising an IP address and an HTTP request for an object, and in response thereto:
constructing a cache key pointing to a cache entry that stores a count, the cache key being based at least in part on one or more data elements in the message,
providing the cache key to an HTTP object cache, the object cache storing HTTP header and HTTP response bodies,
looking up information stored in the object cache under the cache key, the stored information comprising the count, the count tracking particular messages that match a request signature during a time period for rate accounting, and
the object cache returning the count from the lookup, after the object cache returns the count:
issuing an update instruction to the object cache, the update instruction applying a time-to-live of zero to the information stored under the cache key and triggering an asynchronous refresh of the cache entry, which comprises:
issuing a forward request to a refresh service configured as an origin, the forward request comprising the cache key and the count,
the refresh service incrementing the count at least by reading a first value of the count from the forward request and sending a response comprising the cache key and a second value for the count, the object cache receiving and storing the count, incremented as a result the second value, under the cache key.

2. The method of claim 1, wherein the object cache is any of: internal to the server machine, and remote to the server machine.

3. The method of claim 1, wherein the count is included in an HTTP header stored under the cache key.

4. The method of claim 1, wherein the count is included in an HTTP response body stored under the cache key.

5. The method of claim 1, wherein the refresh service is configured as the origin at least by: in a configuration for the cache entry on the server machine, designating an origin hostname that points to the refresh service.

6. A system, comprising:
one or more computers having one or more microprocessors and memory storing computer readable instructions for execution on the one or more microprocessors, the computer readable instructions including an HTTP request handling routine, a refresh service, and a cache manager associated with an object cache that stores HTTP headers and HTTP response bodies;
the request handling routine operative to receive a message from a client, the message comprising an IP address and an HTTP request for an object, and in response thereto, to construct a cache key pointing to a cache entry storing a count, the cache key being based at least in part on one or more data elements in the message, and provide the cache key to the cache manager;
the cache manager operative to look up information stored in the object cache under the cache key, the stored information comprising the count, the count tracking particular messages that match a request signature during a time period for rate accounting, and to return the count to the request handling routine;
the request handling routine further operative to receive the count, and subsequently to issue an update instruction to the cache manager, the update instruction applying a time-to-live of zero to the information stored under the cache key and triggering an asynchronous refresh of the cache entry, which comprises:
the cache manager operating to issue a forward request to a refresh service configured as an origin, the forward request comprising the cache key and the count;
the refresh service operating to increment the count, at least by reading a first value of the count from the forward request and sending a response to the cache manager comprising the cache key and a second value for the count;
the cache manager and the object cache operating to store the count, incremented as a result of the second value, under the cache key, upon receiving the response from the refresh service.

7. The system of claim 6, wherein the cache manager and object cache is any of: local to the request handling routine, and remote to the request handling routine.

8. The system of claim 6, wherein the count is included in an HTTP header stored under the cache key.

9. The system of claim 6, wherein the count is included in an HTTP response body stored under the cache key.

10. The system of claim 6, wherein the refresh service is configured as an origin at least by: storing in the one or more computers an origin hostname in association with the cache entry, the origin hostname pointing to the refresh service.

11. A non-transitory computer-readable medium storing computer program instructions that when executed on one or more microprocessors in one or more computers cause the execution of the following steps:
receiving a message from a client, the message comprising an IP address and an HTTP request for an object, and in response thereto:
constructing a cache key pointing to a cache entry storing a count, the cache key being based at least in part on one or more data elements in the message,
provide the cache key to an HTTP object cache, the object cache storing HTTP header and HTTP response bodies,
looking up information stored in the object cache under the cache key, the stored information comprising the count, the count tracking particular messages that match a request signature during a time period for rate accounting, and
the object cache returning the count from the lookup,
after the object cache returns the count:
issuing an update instruction to the object cache, the update instruction applying a time-to-live of zero to the information stored under the cache key and triggering an asynchronous refresh of the cache entry, which comprises:
issuing a forward request to a refresh service configured as an origin, the forward request comprising the cache key and the count,
the refresh service incrementing the count at least by reading a first value of the count from the forward request and sending a response comprising the cache key and a second value for the count,
the object cache receiving and storing the count, incremented as a result the second value, under the cache key.

12. The non-transitory computer-readable medium of claim 11, wherein the object cache is any of: internal to the server machine, and remote to the server machine.

13. The non-transitory computer-readable medium of claim 11, wherein the count is included in an HTTP header stored under the cache key.

14. The non-transitory computer-readable medium of claim 11, wherein the count is included in an HTTP response body stored under the cache key.

15. The non-transitory computer-readable medium of claim 11, wherein the steps include configuring the refresh service as the origin at least by: in a configuration for the cache entry on the server machine, designating an origin hostname that points to the refresh service.

* * * * *